(12) United States Patent
Zakharov et al.

(10) Patent No.: US 10,097,726 B2
(45) Date of Patent: Oct. 9, 2018

(54) SYSTEM AND METHOD FOR REQUESTING A STATUS REPORT AFTER RECEIVING AN ERROR ALERT

(71) Applicant: KYOCERA Document Solutions Inc., Osaka (JP)

(72) Inventors: Oleg Y. Zakharov, Walnut Creek, CA (US); Keiko Yamaguchi, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/361,694

(22) Filed: Nov. 28, 2016

(65) Prior Publication Data

US 2018/0152590 A1    May 31, 2018

(51) Int. Cl.
*H04N 1/32*    (2006.01)
*H04N 1/00*    (2006.01)
*G06K 9/68*    (2006.01)

(52) U.S. Cl.
CPC ........... *H04N 1/32122* (2013.01); *G06K 9/68* (2013.01); *H04N 1/0005* (2013.01); *H04N 1/00015* (2013.01); *H04N 1/00029* (2013.01); *H04N 1/00061* (2013.01); *H04N 1/00079* (2013.01); *H04N 1/00323* (2013.01); *H04N 1/00344* (2013.01); *H04N 1/32512* (2013.01); *H04N 1/32539* (2013.01); *H04N 1/32625* (2013.01); *H04N 2201/0094* (2013.01); *H04N 2201/3202* (2013.01); *H04N 2201/3205* (2013.01); *H04N 2201/3207* (2013.01); *H04N 2201/3215* (2013.01); *H04N 2201/3247* (2013.01)

(58) Field of Classification Search
CPC .................................................. H04N 1/32122
See application file for complete search history.

(56) References Cited

U.S. PATENT DOCUMENTS

| | | | |
|---|---|---|---|
| 8,531,996 B2 | 9/2013 | Onishi | |
| 8,767,223 B2 | 7/2014 | Tanaka | |
| 9,007,631 B2 | 4/2015 | Hagiwara et al. | |
| 2003/0088630 A1* | 5/2003 | Parry | G06F 3/121 709/206 |
| 2005/0013643 A1* | 1/2005 | Fukano | G06K 15/00 400/76 |
| 2009/0147299 A1 | 6/2009 | Tetu | |

(Continued)

*Primary Examiner* — Jacky X Zheng
(74) *Attorney, Agent, or Firm* — Weiss & Moy, P.C.; Jeffrey D. Moy

(57) ABSTRACT

A method of generating a status report from an image forming device comprises: recording an error notification in real time from the image forming device; analyzing the error notification received, wherein analyzing the error notification comprises: detecting a sequential pattern in the recorded error notification; and analyzing the sequential pattern detected; sending a request to the image forming device for a first status report if the sequential pattern detected in the error notification matches one of pre-stored sequential patterns corresponding to an error for which the first status report is requested; receiving the first status report using bidirectional communication protocols; analyzing data in the first status report; diagnosing the image forming device based on the data analyzed; and generating an action request.

11 Claims, 6 Drawing Sheets

(56) References Cited

U.S. PATENT DOCUMENTS

2010/0030617 A1\* 2/2010 Handley ................ G06Q 10/06
    358/1.15
2011/0007340 A1\* 1/2011 Masuyama ........ G03G 15/5075
    358/1.14

\* cited by examiner

FIG. 6

```
Device PD_KYLEF3500183

Service Status Page

3005ci

14/10/2013 14:15

Controller Information

Memory Status

Total Size  3.5 GB

Paper Jam Log
  # Count. Event Descriptions  Date and Time
    Log Data Nothing...

Service Call Log
  # Count. Service Code  Date and Time
    Log Data Nothing...

Maintenance Log
  # Count. Item.  Date and Time
    Log Data Nothing...

Installed Options

Document Processor  Installed

Paper Feeder  Cassette (500 x 2)

Side Feeder  Not Installed

Finisher  4000-Finisher

Job Separator  Installed

Document Guard(B)  Not Installed

Card Authentication Kit (B)  Not Installed

Internet FAX Kit(A)  Not Installed

Security Kit(E)  Installed
```

SYSTEM AND METHOD FOR REQUESTING A STATUS REPORT AFTER RECEIVING AN ERROR ALERT

TECHNICAL FIELD

The present application in general relates to printing devices, and more specifically, to a system and method that allows a server or other type of management device to monitor one or more printing devices for error alerts and to request the printing device sending the error alert to generate and submit a status report when the error alert corresponds to a pre-stored pattern corresponding to an error for which the first status report is requested.

BACKGROUND

In order to properly maintain image forming devices such as printers, copiers, facsimile, and multi-function peripherals, remote management systems have been designed to collect various items of management information, such as maintenance management information, working state and failure information of the image forming devices. In past remote management systems, each image forming device may have been equipped with a communication device. The communication devices may send management information to a central management device. Thus, device management is performed individually for each image forming device. However, presently, most remote management systems are networked based. Thus, most image forming devices may be coupled to a communication network so that the connection between the image forming devices and the central management device is established via the network.

Presently, most remote management systems query the image forming devices connected thereto at predetermined intervals of time in order to keep track of the current states of these devices. However, querying the image forming devices only at predetermined intervals of time may not allow the remote management systems to timely identify issues with the image forming device.

Therefore, it would be desirable to provide a system and method that overcomes the above. The system and method would provide for a remote management system to dynamically request a status report from an image forming device.

SUMMARY

In accordance with one embodiment, a method of generating a status report from an image forming device is disclosed. The method comprises: recording an error notification in real time from the image forming device; analyzing the error notification received, wherein analyzing the error notification comprises: detecting a sequential pattern in the recorded error notification; and analyzing the sequential pattern detected; sending a request to the image forming device for a first status report if the sequential pattern detected in the error notification matches one of pre-stored sequential patterns corresponding to an error for which the first status report is requested; receiving the first status report using bidirectional communication protocols; analyzing data in the first status report; diagnosing the image forming device based on the data analyzed; and generating an action request.

In accordance with one embodiment, a method of generating a status report from an image forming device is disclosed. The method comprises: receiving an error notification from the image forming device in real time; detecting a sequential pattern in the error notification received; analyzing the sequential pattern detected; sending a request to the image forming device for a first status report if the pattern detected in the error notification matches one of pre-stored sequential patterns corresponding to an error for which the first status report is requested, wherein the sequential pattern is characterized by at least one of a time interval or a sequential pattern for a designated image forming device type; receiving the first status report using bidirectional communication protocols; analyzing data in the first status report; and diagnosing the image forming device based on the data analyzed.

In accordance with one embodiment, a system for monitoring and communicating with an image forming device is disclosed. The system has a first server coupled to the image forming device to record an error notification from the image forming device in real time, detect a sequential pattern in the error notification received, analyzing the sequential pattern detected, send a request to the image forming device for a first status report if the sequential pattern detected in the error notification matches one of pre-stored sequential patterns corresponding to an error for which the first status report is requested, wherein the pattern is characterized by at least one of a time interval or a sequential pattern for a same model image forming device.

BRIEF DESCRIPTION OF THE DRAWINGS

The present application is further detailed with respect to the following drawings. These figures are not intended to limit the scope of the present invention but rather illustrate certain attributes thereof.

FIG. 6 is an exemplary embodiment of a status report of the image forming device depicted in FIG. 1 according to one aspect of the present application.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method relates to a remote management system that monitors image forming devices. When the remote management system submits an error alert in near real time mode, the remote management system analyzes and determines if more detail information is needed. When more information is needed the remote management system may requests the image forming device to provide a status report.

Figure 1:
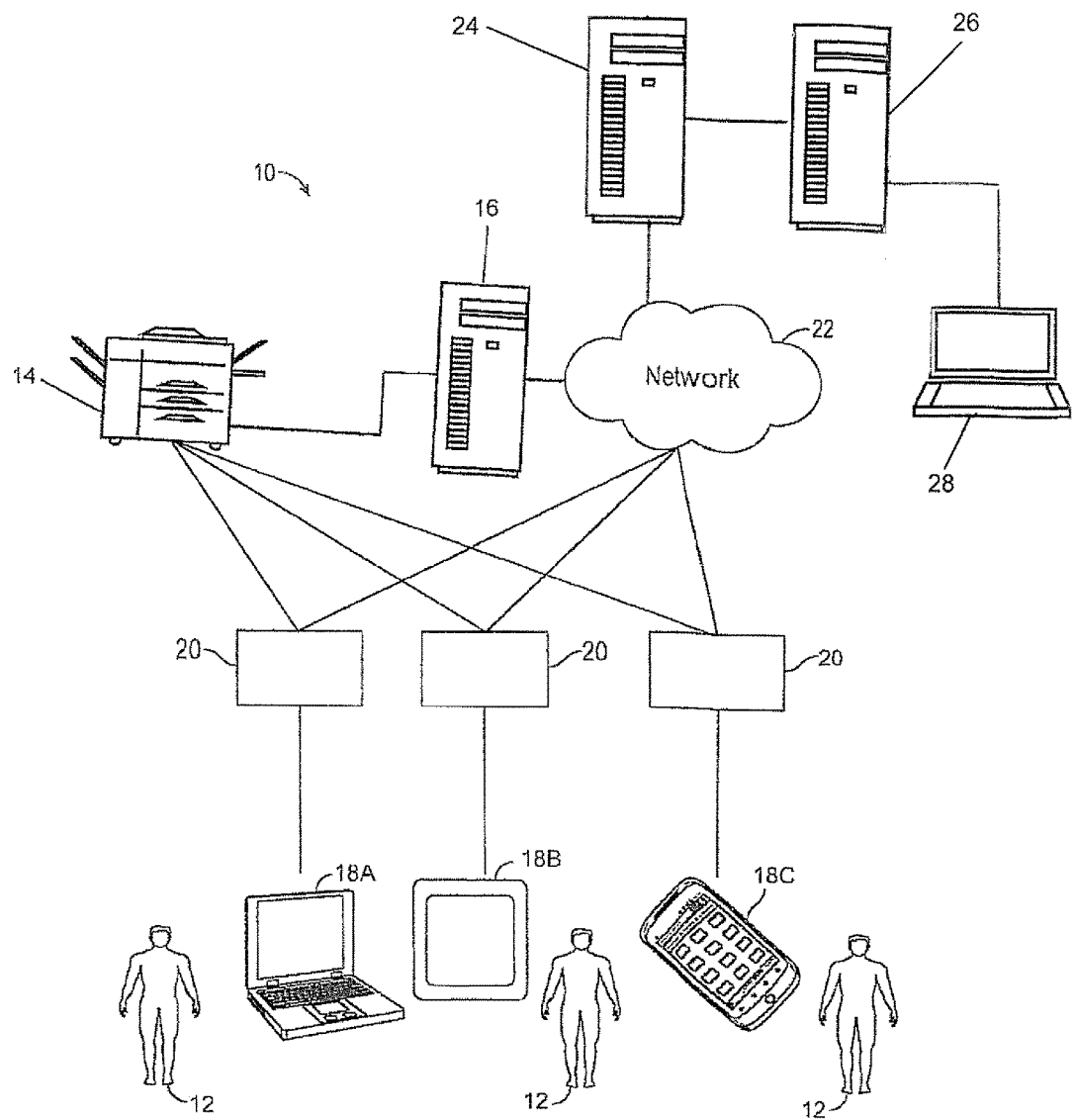
FIG. 1 is a diagram of an exemplary remote management system according to one aspect of the present application.

Referring now to FIG. 1, a remote management system 10 (hereinafter system 10) may be shown. The system 10 may monitor one or more image forming devices 14. The image forming device 14 may be any type of device having printing capabilities. For example, the image forming device 14 may be a printer, a copier, a fax machine, a multi-function peripheral including a scanner and one or more of functions of a copier, a facsimile device, and a printer and/or other types of rendering devices. The image forming device 14 may be used for outputting a print job.

The image forming device 14 may be coupled to a print server 16. The print server 16 may be used to connect the image forming device 14 to one or more computing devices 18 over a network 22. The network 22 may be a local area network (LAN), a general wide area network (WAN), wireless local area network (WLAN) and/or a public network. The print server 16 may accept print jobs from the computing device 18 and may send the print jobs to the appropriate image forming device 14. The print server 16 may queue the jobs locally as print jobs may arrive more quickly than the image forming device 14 may be able to print. Alternatively, or in addition to, the computing device 18 may be directly coupled to the image forming device 14.

Individuals 12 may use one or more computing devices 18 to send print jobs to the image forming device 14 via a printing application 20 loaded on the computing device 20. The computing devices 18 may send the print jobs directly to the image forming device 14 or through the print server 16. The computing devices 18 may be a client computer system such as a desktop computer, handheld or laptop device, tablet, mobile phone device, server computer system, multiprocessor system, microprocessor-based system, network PCs, and distributed cloud computing environments that include any of the above systems or devices, and the like. The computing device 18 may be described in the general context of computer system executable instructions, such as program modules, being executed by a computer system as may be described below. In the embodiment shown in FIG. 1, the computing device 18 may be seen as a desktop/laptop computing system 18A, a tablet device 18B and a mobile phone device 18C. However, this should not be seen in a limiting manner as any computing device 18 described above may be used.

The system 10 may have a communication server 24. The communication server 24 may be coupled to the one or more image forming devices 14. The communication server 24 may be coupled directly to the image forming devices 14 through the network 22 or may be coupled to the image forming devices 14 through the print server 16 and the network 22. The communication server 24 may be used to receive error alerts sent by the image forming devices 14. The communication server 24 may analyze the error alert received in order to detect a pattern in the recorded error alert. The communication server 24 may pull historical records related to the image forming device 14 sending the error alert. The historical records may be stored in a local database within the communication server 24 and/or on an external database accessible by the communication server 24. The communication server 24 may send a request to the image forming device 14 for a status report if the pattern detected in the error alert matches one of pre-stored patterns corresponding to an error for which the first status report is requested. The status report may include detailed information about the image forming device 14 and can be used for issuing a troubleshooting ticket as describe below. The communication server 24 may be hosted by any party. In accordance with one embodiment, the communication server 24 may be hosted by a third party vendor. For example, the communication server 24 may be hosted by a $3^{rd}$ party vendor selling and/or renting the image forming device 14, $3^{rd}$ party vendor responsible for maintaining the image forming device or other vendors associated with the image forming device.

An analytical server 26 may be coupled to the communication server 24. The analytical server 26 may be used to analyze and extract information from the status reports in order to run diagnosis to identify the issue causing the error alert. The analytical server 26 may be hosted by different parties. In accordance with one embodiment, the analytical server 26 may be hosted by the $3^{rd}$ party vendor hosting the communication server 24 or other similar vendors. Alternatively, the analytical server 26 may be hosted by the OEM of the image forming device 14. This may allow the analytical server 26 to accumulate large amounts of data for analysis. It should be noted that while the present description of the system 10 discloses the communication server 24 and the analytical server 26 as two separate devices, the functions of the communication server 24 and the analytical server 26 may be performed by a single server.

If the analytical server 26 identifies an issue with the image forming device 14, the analytical server 26 may send a signal to a ticketing server 28. The ticketing server 28 may be used to generating a ticket in a human-readable format, wherein the ticket includes information on the determined issue. The ticketing server 28 may register the ticket and schedule a time for the image forming device 14 to be serviced.

Figure 2:
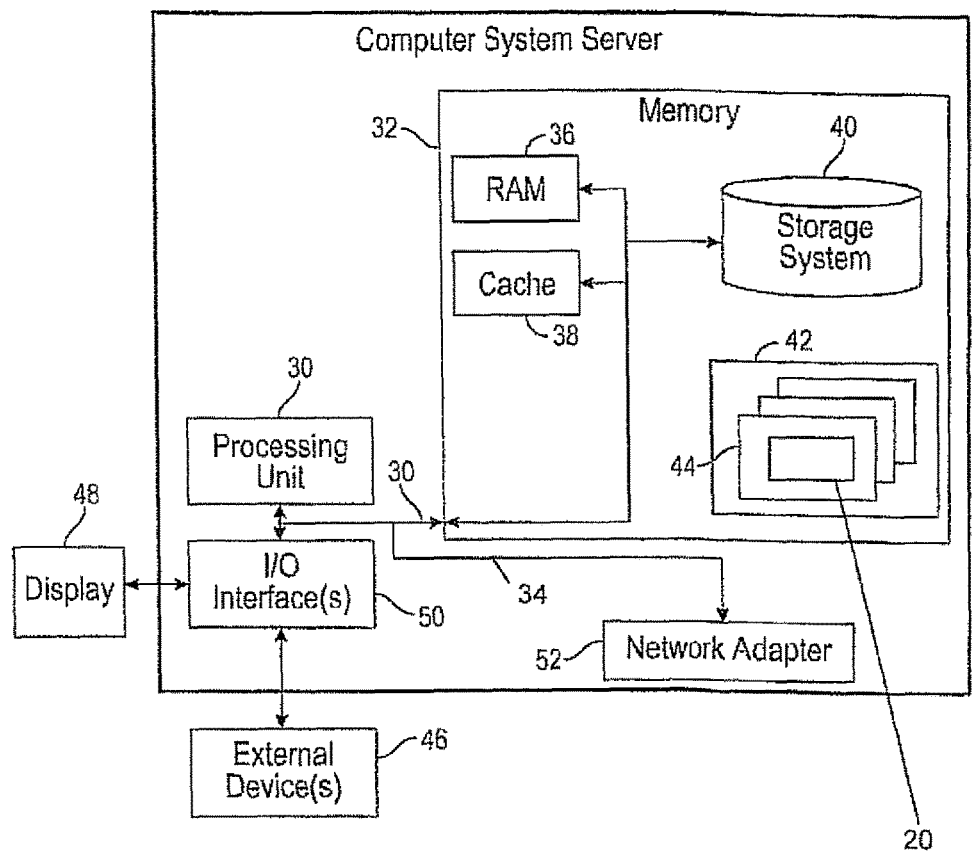
FIG. 2 is a simplified block diagram showing an illustrative server device depicted in FIG. 1 in accordance with one aspect of the present application.

Referring now to FIG. 2, communication server 24 and the analytical server 26 may be described in more detail in terms of the machine elements that provide functionality to the systems and methods disclosed herein. The components of the communication server 24 and the analytical server 26 may include, but are not limited to, one or more processors or processing units 30, a system memory 32, and a system bus 34 that couples various system components including the system memory 32 to the processor 30. The communication server 24 and the analytical server 26 may typically include a variety of computer system readable media. Such media may be chosen from any available media that is accessible by the communication server 24 and/or analytical server 26, including non-transitory, volatile and non-volatile media, removable and non-removable media. The system memory 32 could include one or more personal computing system readable media in the form of volatile memory, such as a random access memory (RAM) 36 and/or a cache memory 38. By way of example only, a storage system 40 may be provided for reading from and writing to a non-removable, non-volatile magnetic media device typically called a "hard drive".

The system memory 32 may include at least one program product/utility 42 having a set (e.g., at least one) of program modules 44 that may be configured to carry out the functions of embodiments of the invention. The program modules 44 may include, but is not limited to, an operating system, one or more application programs, other program modules, and program data. Each of the operating systems, one or more application programs, other program modules, and program data or some combination thereof, may include an implementation of a networking environment. The program modules 44 generally carry out the functions and/or methodologies of embodiments of the invention as described herein. For example, a program module 44 in the communication server 24 may be configured to pull historical records from a database stored in the system memory 32 and/or external memory device and check a time interval between error alerts and to send request to the image forming device 14 to send a status report if the time interval exceeds a specific threshold. A program module 44 in the analytical server 26 may be configured to determine the value of a threshold which may be used by the communication server 24 to trigger a status report request and to extract information from status reports in order to run diagnosis The communication server 24 and/or analytical server 26 may communicate with one or more external devices 46 such as a keyboard, a pointing device, a display 48, or any similar devices (e.g., network card, modem, etc.). The display 48 may be a Light Emitting Diode (LED) display, Liquid Crystal Display (LCD) display, Cathode Ray Tube (CRT) display and similar display devices. The external devices 46 may enable the communication server 24 and/or analytical server 26 to communicate with the image forming device 14 (FIG. 1). Such communication may occur via Input/Output (I/O) interfaces 50. Alternatively, the communication server 24 and/or analytical server 26 may communicate with one or more networks 22 (FIG. 1) such as a local area network (LAN), a general wide area network (WAN), and/or a public network via a network adapter 52. The communication server 24 and/or analytical server 26 may be coupled to the one or more networks via a wired or wireless connection. As depicted, the network adapter 52 may communicate with the other components via the bus 34.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 40) may be utilized. In the context of this disclosure, a computer readable storage medium may be any tangible or non-transitory medium that can contain, or store a program (for example, the program product 42) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 3:
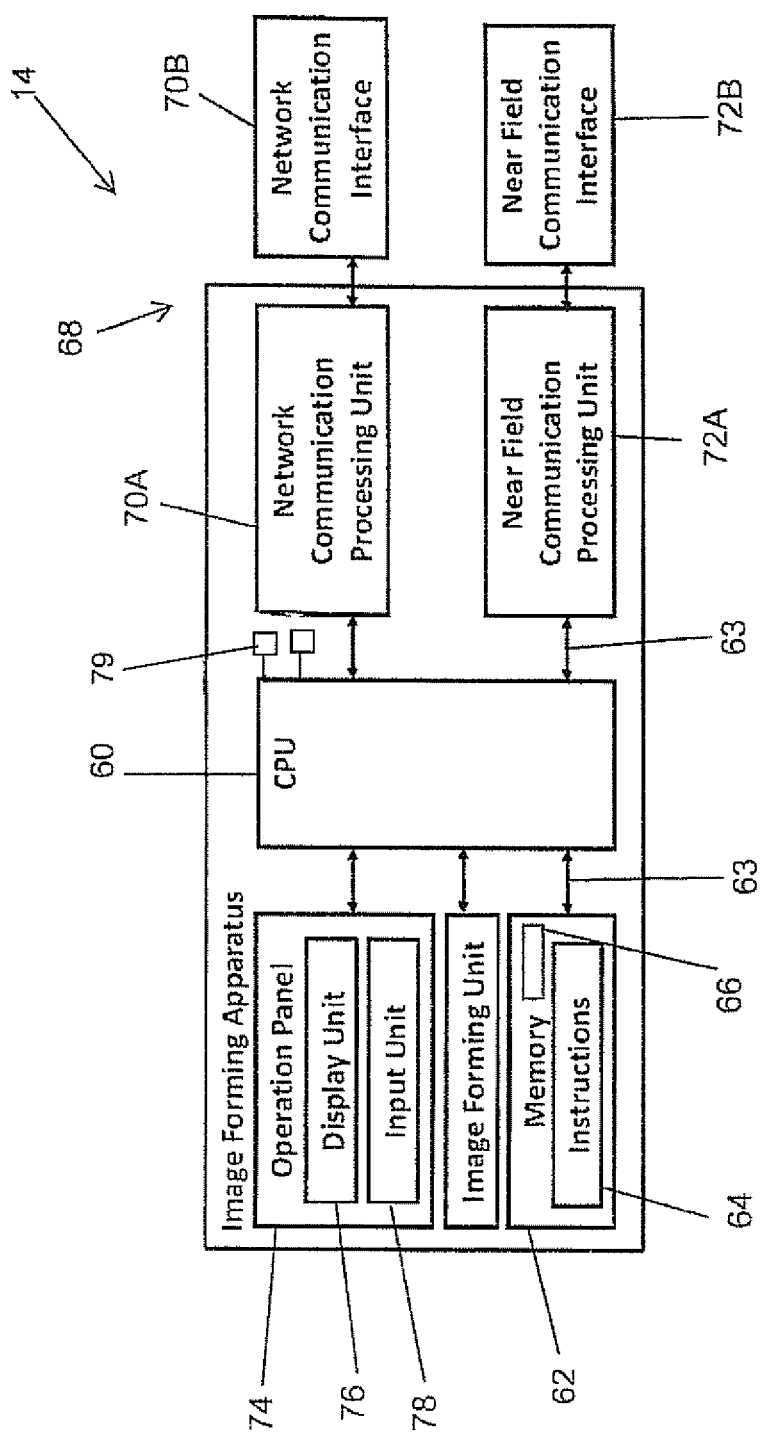
FIG. 3 is a simplified block diagram showing an illustrative image forming device depicted in FIG. 1 according to one aspect of the present application.
Figure 4:
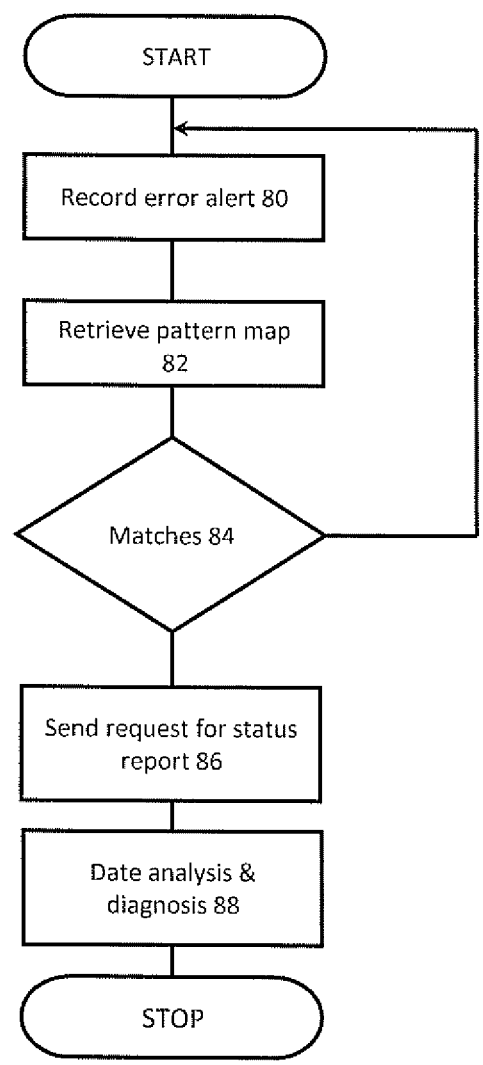
FIG. 4 is an exemplary embodiment of a flowchart depicting a method for requesting a status report according to one aspect of the present application.
Figure 5:
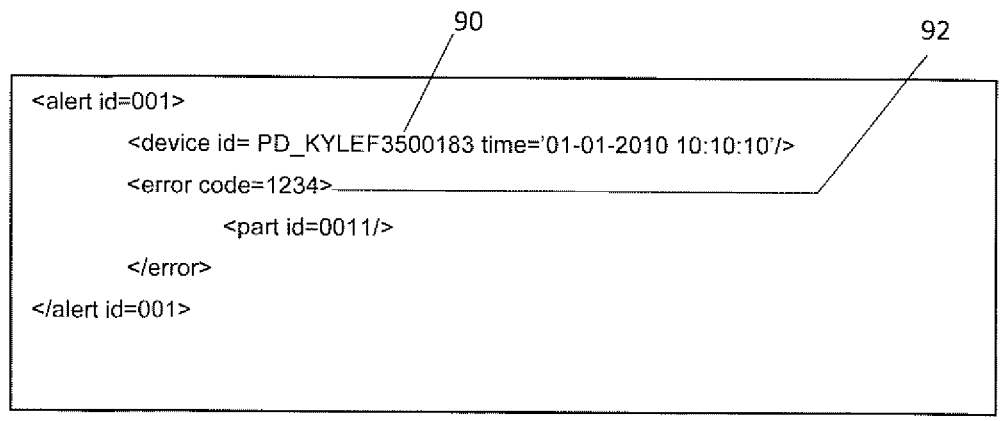
FIG. 5 is an exemplary embodiment of an error alert sent by the image forming device depicted in FIG. 1 according to one aspect of the present application.

Referring now to FIG. 3, the image forming device 14 may be described in more detail in terms of the machine elements that provide functionality to the systems and methods disclosed herein. The components of the image forming device 14 may include, but are not limited to, one or more processors or processing units 60, a system memory 62, and a system bus 63 that may couple various system components including the system memory 62 to the processor 60. The image forming device 14 may typically include a variety of computer system readable media. Such media could be chosen from any available media that is accessible by the image forming device 14, including non-transitory, volatile and non-volatile media, removable and non-removable media. The system memory 62 could include one or more image forming device readable media in the form of volatile memory, such as a random access memory (RAM) and/or a cache memory. By way of example only, the system memory 62 may be provided for reading from and writing to a non-removable, non-volatile magnetic media device typically called a "hard drive".

The system memory 62 may include at least one program product/utility 64 having a set (e.g., at least one) of program modules 66 that may be configured to carry out the functions of embodiments of the invention. The program modules 66 may include, but is not limited to, an operating system, one or more application programs, other program modules, and program data. Each of the operating systems, one or more application programs, other program modules, and program data or some combination thereof, may include an implementation of a networking environment. The program modules 66 may include procedures such as a page converter, rasterizer, compression code, page print scheduler, print engine manager, and similar printing applications (i.e., printer firmware). The program modules 66 generally carry out the functions and/or methodologies of embodiments of the invention as described herein.

The image forming device 14 may have one or more communication modules 68. The communication modules 68 may allow the image forming device 14 to communicate with one or more networks (i.e., network 22 shown in FIG. 1) such as a local area network (LAN), a general wide area network (WAN), wireless local area network (WLAN) and/or a public network. In accordance with one embodiment, the communication modules 68 may include a network communication processing unit 70A coupled to a network communication interface 70B. The network communication processing unit 70A and the network communication interface 70B may allow the image forming device 14 to communicate with one or more networks 22. These networks 22 may be a local area network (LAN), a general wide area network (WAN), a wireless local area network, a public network, a cellular network as well as other type of networks. The communication modules 68 may include a near field communication processing unit 72A coupled to a near field communication interface 72B. The near field communication processing unit 72A and the near field communication interface 72B may allow the image forming device 14 to communicate with other electronic devices located near the image forming device 14 using Bluetooth, infrared or similar wireless communication protocols.

The image forming device 14 may include an operation panel 74. The operation panel may include a display unit 76 and an input unit 78 for facilitating human interaction with the image forming device 14. The display unit 76 may be any electronic video display, such as a LCD display, LED display and similar display types. The input unit 78 may include any combination of devices that allow users to input information into the operation panel 74, such as buttons, a keyboard, switches, and/or dials. In addition, the input unit 78 may include a touch-screen digitizer overlaid onto the display unit 76 that can sense touch and interact with the display unit 76.

The image forming device 14 may have one or more sensors 79. Each sensor 79 may be used to monitor certain operating conditions of the image forming device 14. Sensors 79 may be used to indicate a location of a paper jam, document miss-feed, toner level, as well as other operating conditions. The above is given as examples and should not be seen in a limiting manner. Each sensor 79 may be coupled to the processor 60. When a sensor 79 detects an operational issue as may be disclosed below, the sensor 79 may send a signal to the processor 60. The processor 60 may generate an error alert associated with the operational issue. The processor 60 may transmit the error alert to an external device as disclosed below using one of the communication modules 68.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, system memory 62) may be utilized. In the context of this disclosure, a computer readable storage medium may be any tangible or non-transitory medium that can contain, or store a program (for example, the program module 66) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Referring now to FIGS. 1-6, operation of the system 10 in accordance with one exemplary embodiment may be described. When the image forming device 14 experiences certain failures or abnormal situations such as an alarm condition, the image forming device 14 may generate an error alert. An example of an error alert may be seen in FIG. 5. In accordance with one embodiment the error alert may be Extensible Markup Language (XML) error message sent from the image forming device 14. The error alert may include image forming device identification information 91, a failure/error code 92 associated with the failure/abnormal situation along with additional information such as date and time of occurrence. The above is given as an example and should not be seen in a limiting manner. Other information related to the failure/abnormal situation may be included other than those listed above.

The image forming device 14 may send the error alert to the communication server 24. The image forming device 14 may send the error alert in real time or near real time once the sensor 69 detects an operating issue. In accordance with one embodiment, the image forming device 14 may utilize bidirectional protocols for communicating with the communication server 24. For example, Extensible Messaging and Presence Protocol (XMPP) may be used for communications between the image forming device 14 and the communication server 24. XMPP is a communications protocol for message-oriented middleware based on XML (Extensible Markup Language). It enables the real time and/or near real time exchange of structured yet extensible data between the image forming device 14 and the communication server 24 or any two or more network entities.

The communication server 24 may record the error alert from the image forming device 14 as shown in 80. The communication server 24 may analyze the error alert received in order to detect a pattern in the error alert recorded. In general, the pattern is characterized by at least one of a time interval or a sequential pattern. In accordance with one embodiment, a predetermined number of errors within a predetermined timeframe may indicate an issue with the image forming device 14. For example, a certain number of paper jam errors recorded within a predetermined time frame may indicate that rollers within the image forming device 14 may need to be serviced and/or replaced. Similarly, a certain pattern of errors may indicate an issue with the image forming device 14. For example, if there is a certain progressive pattern in errors, i.e., number of paper jams increases above a predetermined amount, this may indicate that rollers within the image forming device 14 may need to be serviced and/or replaced.

If the error alert received is one that may have a low rate of occurrence, the communication server 24 may record the error alert for a predetermined time period. The communication server 24 may not take any further action as a low rate of occurrence may indicate no service and/or replacement of parts is needed.

However, as more error alerts are received by the communication server 24, analysis of the error alerts may need to be performed. To analyze the error alert received, the communication server 24 may retrieve a pattern mapping table as shown in 82. In accordance with one embodiment, the pattern mapping table may be stored in system memory 32 of the communication server 24. The pattern mapping table may store a plurality of entries. The entries may be related to: pattern entries corresponding to respective error patterns, predetermined time interval thresholds associated with the respective pattern entries, and names of the status report corresponding to the respective pattern entries. The above is given as examples and should not be seen in a limiting manner.

The communication server 24 may try and match the error pattern detected with one of the plurality of pattern entries in the pattern mapping table as shown in 84. The communication server 24 may send a request to the image forming device 14 for a status report if the pattern detected in the error alert matches one of pre-stored patterns corresponding to an error for which the status report is requested as shown in 86.

In accordance with one embodiment, the communication server 24 may retrieve a predetermined time interval threshold corresponding to the error pattern matched. The communication server 24 may check a time interval between receipt of the error alert and receipt of last recorded error alert and determine if the time interval is greater than the predetermined time interval threshold retrieved. The communication server 24 may extract a name of a status report corresponding to a respective pattern entry associated with the error pattern when the time interval is greater than the predetermined time interval threshold. The communication server 24 may then send the action request to the image forming device 14 for the status report.

An embodiment of a status report may be seen in FIG. 6. The status report may consist of detailed information about a current status of the image forming device 14. As may be seen in FIG. 6, the status report may contain information relating to an identification number of the image forming device, date/time of the status report was generated, number and type of errors alerts generated, a listing of a service and/or maintenance log, installed accessories on the image forming device 14, as well as other information. The above listing may be given as an example and should not be seen in a limiting manner.

The status report may be submitted by the image forming device 14 to the communication server 24 utilizing network protocols such as HTTP over the network 22 and by utilizing such application protocols as web services, SOAP, REST API and the like. For different type of errors recorded, different types of status reports could be requested by the communication server 24.

The status report may need to be parsed on the communication server 24 in order to extract needed information. The communication server 24 analyze line by line the status report to obtain the needed information which may be used for diagnosis of the errors recorded transmitted by the image forming device 14.

In a situation where the image forming device 14 may need to be restarted or turned into a 'Maintenance Mode' (i.e., when the user cannot use the printer for normal operations), the communication server 24 may send the warning message to the display 76 of the image forming device 14 prior to such actions. The communication server 24 may decide to send a signal to restart the image forming device 14 in order to fix a problem and make a request for another status report to confirm the fix went well.

Based on an analysis of the status report, the communication server 24 may require additional information. Thus, the communication server 24 may request the image forming device 14 to send additional information. Based on the analysis of the status report, the processing unit 30 of the communication server 24 may make a decision on what kind of additional information may be needed. When the processing unit 30 makes a determination of what additional information may be required, the communication server 24 may send the request to the image forming device 14 for the additional information. The communication server 24 may request that the additional information be sent to a specific Uniform Resource Identifier (URI) and within a specific timeframe. For example, the communication server 24 may request the image forming device 14 to send information on whether the error alert has been cleared. The communication server 24 may request the image forming device 14 to send a request for another status report or for the status report to be sent on a recurring basis. The additional status reports may include additional information on the error alert and/or other information on the image forming device 14. The communication server 24 may request the image forming device 14 to operate, for example, print a test page to see the operating capability of the image forming device 14. It should be noted that the communication server 24 may continuously monitor the image forming device 14 in order to determine if the error associated with the error alert has been addressed. If the error alert has been addressed, the communication server 24 may send a signal to cancel the request to send additional status reports.

Based on the analysis of the status report, the communication server 24 may send a warning message to the image forming device 14. The image forming device 14 may display the warning message on an operation panel 74 on the image forming device 14. For example, a warning message not to use the image forming device 14 until serviced may be displayed on the operation panel 74. A warning message may be displayed informing a user to switch the image forming device 14 off or switch the image forming device 14 from a normal operating mode to a stand-by mode or other operating mode. The above given as examples and should not be seen in a limiting manner. The communication server 24 may send other types of messages to the image forming device 14

The analytical server 26 may receive the status report and extracting information from the status report as shown in 88. The analytical server 26 may extract information in order to diagnosis an issue on the image forming device 14. In general, the issue may be categorized in at least one of: a mechanical problem, a software/firmware problem, and/or an operational/customer problem.

Based on the issue identified, the analytical server 26 may signal a ticketing server 28. The ticketing server 28 may be used to generating a ticket in a human-readable format, wherein the ticket includes information on the determined issue. The ticketing server 28 may register the ticket and schedule a time for the image forming device 14 to be serviced. If the issue with the mage forming device 14 is rectified prior to being serviced, the ticketing server 28 may discard the ticket.

Once the image forming device 14 has been repaired, the image forming device 14 may be reset to a normal operating mode and any warning message being displayed may be removed.

In the above description, the operation may have been described using a regression analysis. Regression analysis may be defined as a statistical process for estimating the relationships among variables. It generally may include different techniques for modeling and analyzing several variables, when the focus is on the relationship between a dependent variable and one or more independent variables. More specifically, regression analysis helps one understand how the typical value of the dependent variable changes when any one of the independent variables is varied, while the other independent variables may be held fixed.

In accordance with another embodiment, instead of using regression analysis, a multinomial logistic regression model may be used in place of or in addition to the regression analysis. Multinomial logistic regression may be defined as applying logistic regression analysis to multiclass problems, i.e. with more than two possible discrete outcomes. In other words, it is a model that is used to predict the probabilities of the different possible outcomes of a categorically distributed dependent variable, given a set of independent variables.

In operation, the logistic regression model may allow the communication server 24 to map discrete outcomes to correspond with multiple independent variables. In accordance with one embodiment, independent variables may consist of a sequence of incoming error notifications (events) with recorded timestamps from the image forming device 14, the status of the image forming device 14, error codes from the image forming device 14, as well as other communications from the image forming device 14. The above is given as examples of independent variables and should not be seen in a limiting manner.

In statistics, a multinomial logistic regression model may allow for two or more discrete outcomes. For example, at least one outcome may be a type of report that may need to be requested from the image forming device 14. A second outcome may be at least one action that needs to be applicable to the image forming device 14, for example: restart the image forming device 14, display a custom message on the display 76 of the image forming device 14. Another outcome may be at least one time schedule that the image forming device 14 may need to follow in order to submit the requested data report.

As an example of the above, an image forming device 14 may need different maintenance work based on type of error (ErrCd), frequency of error (ErrFr) and duration when such error (ErrDr) occurred sent to the communication server 24. Additionally, to this information, a decision on what kind of maintenance work needs to be done, another type of information may need to be obtained from the image forming device 14 through the image forming device's Usage Report: print volume (PV) that device has been produced, average size of print jobs (JS) and toner coverage (TC) and the like.

In other cases, additional information may need to be obtained through the image forming device's Status Report. This may include, but is not limited to: version of currently installed firmware (FV), counters of printer drum (Drum-Cnt), transfer belts (BeltCnt), fuser (FuserCnt) and other device's parts.

In operation, the logistic regression model takes the following: type of error (ErrCd), frequency of error (ErrFr), and duration when such error (ErrDr) occurred as input independent variables. The regression model may then outline: a type of device report is needed, what actions need to be done on the image forming device 14, and a schedule for these actions that may need to be follow.

The foregoing description is illustrative of particular embodiments of the invention, but is not meant to be a limitation upon the practice thereof. The following claims, including all equivalents thereof, are intended to define the scope of the invention.

What is claimed is:

1. A method of generating a status report from an image forming device comprising:
    recording an error notification in real time from the image forming device;
    analyzing the error notification received, wherein analyzing the error notification comprises:
        detecting a sequential pattern in the recorded error notification; and
        analyzing the sequential pattern detected;
    sending a request to the image forming device for a first status report if the sequential pattern detected in the error notification matches one of pre-stored sequential patterns corresponding to an error for which the first status report is requested, the first status report containing operating conditions of the image forming device;
    receiving the first status report using bidirectional communication protocols;
    analyzing data in the first status report;
    diagnosing the image forming device based on the data analyzed; and
    generating an action request.

2. The method of claim 1, comprising sending the error notification from the image forming device when an error is monitored by the image forming device in real time, wherein the notification includes at least one of an error code, an error location, and a device stamp.

3. The method of claim 1, wherein the sequential pattern detected in the error notification received is characterized by at least one of a time interval or a sequential pattern for each image forming device.

4. The method of claim 1, wherein generating an action request comprises sending requests for at least one of: generating data with additional information; generating at least one status report with additional information and recurrently submitting the report to a specific server URI; generating at least one second status reports having different data from data in the first status report and submitting it to a specific URI within a specific time frame; and sending at least one instruction command to operate the image forming device.

5. The method of claim 1, comprising utilizing a multinomial logistic regression model, wherein independent variables used for the multinomial logistic regression model comprises at least one of: time intervals between sequential errors, codes of errors, and a status on the image forming device, and dependent variables used for the multinomial logistic regression model comprises at least one names of status reports corresponding to respective submission schedules and actions.

6. The method of claim 1, comprising:
    retrieving a pattern mapping table, wherein the pattern mapping table having a plurality of: pattern entries corresponding to respective error sequential patterns, predetermined time interval thresholds associated with the respective error sequential pattern entries, and names of status reports corresponding to the respective error sequential pattern entries;
    matching the sequential pattern detected with one of the plurality of pattern entries corresponding to the respective error sequential patterns;
    retrieving the predetermined time interval threshold corresponding to the error sequential pattern matched;
    checking a time interval between receipt of the error notification in real time and receipt of last recorded error notification;
    determining if the time interval is greater than the predetermined time interval threshold retrieved;
    extracting a name of a status report corresponding to a respective error sequential pattern entry associated with the matched sequential pattern when the time interval is greater than the predetermined time interval threshold; and
    sending the action request to the image forming device for the status report.

7. The method of claim 6, comprising determining a status on addressing an error corresponding to the retrieved status report when at least another error alert is sent after the status report is sent.

8. The method of claim 1, comprising:
    extracting information from the status report;
    diagnosing an issue on the image forming device based on the extracted information;
    generating a ticket in a human-readable format, wherein the ticket includes information on the determined issue; and
    registering the ticket to a maintenance managing server.

9. The method of claim 8, wherein the issue is categorized in at least one of: a mechanical problem, a software/firmware problem, and an operational/customer problem.

10. The method of claim 8, comprising discarding the ticket if the maintenance managing server determines the error is solved.

11. The method of claim 8, comprising:
    sending a warning message to the image forming device; and
    displaying the warning message on an operation panel on the image forming device.

* * * * *